(12) United States Patent
Giller

(10) Patent No.: US 10,357,918 B2
(45) Date of Patent: *Jul. 23, 2019

(54) PROCESS AND APPARATUS FOR FABRICATION OF THREE DIMENSIONAL OBJECTS

(71) Applicant: Rize Inc., Woburn, MA (US)

(72) Inventor: Eugene Giller, Wellesley, MA (US)

(73) Assignee: RIZE INC., Woburn, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/991,448

(22) Filed: May 29, 2018

(65) Prior Publication Data

US 2018/0272596 A1 Sep. 27, 2018

Related U.S. Application Data

(63) Continuation of application No. 14/965,470, filed on Dec. 10, 2015, which is a continuation of application
(Continued)

(51) Int. Cl.
*B29C 67/00* (2017.01)
*B29C 64/106* (2017.01)
(Continued)

(52) U.S. Cl.
CPC ........ *B29C 64/106* (2017.08); *B29C 35/0805* (2013.01); *B29C 37/0067* (2013.01);
(Continued)

(58) Field of Classification Search
CPC ... B29C 64/112; B29C 64/118; B29C 64/205; B29C 64/209
See application file for complete search history.

(56) References Cited

U.S. PATENT DOCUMENTS 4,463,359 A 7/1984 Ayata et al.
4,549,191 A 10/1985 Fukuchi et al.
(Continued)

FOREIGN PATENT DOCUMENTS

CN 103180125 A 6/2013
CN 103180125 B 3/2017
(Continued)

OTHER PUBLICATIONS

Weeren, et al., "Quality of Parts Processed by Fused Deposition," *Solid free form fabrication symposium*, pp. 317-341 (1995).
(Continued)

*Primary Examiner* — James Sanders
(74) *Attorney, Agent, or Firm* — Mintz Levin Cohn Ferris Glovsky and Popeo, P.C.

(57) ABSTRACT

A fabrication process and apparatus for producing three-dimensional objects by depositing a first polymer layer, printing a first ink layer on to the first polymer layer, depositing a second polymer layer on to the first ink layer, and printing a second ink layer on to the second polymer layer. The deposition and printing steps may be repeated until a three-dimensional object is formed. The inks used to form at least one of the first and second ink layers may include dyes or pigments so that the three-dimensional object may be a colored three-dimensional object.

30 Claims, 5 Drawing Sheets

Related U.S. Application Data

No. 13/881,554, filed as application No. PCT/US2011/057837 on Oct. 26, 2011, now Pat. No. 9,227,366.

(60) Provisional application No. 61/451,350, filed on Mar. 10, 2011, provisional application No. 61/407,401, filed on Oct. 27, 2010.

(51) Int. Cl.

| | |
|---|---|
| *B29C 37/00* | (2006.01) |
| *B33Y 70/00* | (2015.01) |
| *B29C 35/08* | (2006.01) |
| *B29C 64/129* | (2017.01) |
| *B29C 64/124* | (2017.01) |
| *B29C 64/118* | (2017.01) |
| *B29C 64/135* | (2017.01) |
| *B33Y 10/00* | (2015.01) |
| *B33Y 30/00* | (2015.01) |
| *B29C 64/00* | (2017.01) |
| *B29C 64/112* | (2017.01) |
| *B29C 64/165* | (2017.01) |
| *B29C 64/40* | (2017.01) |
| *B29K 71/00* | (2006.01) |
| *B29K 73/00* | (2006.01) |
| *B29K 75/00* | (2006.01) |

(52) U.S. Cl.
CPC ............ *B29C 64/00* (2017.08); *B29C 64/112* (2017.08); *B29C 64/118* (2017.08); *B29C 64/124* (2017.08); *B29C 64/129* (2017.08); *B29C 64/135* (2017.08); *B29C 64/165* (2017.08); *B29C 64/40* (2017.08); *B33Y 10/00* (2014.12); *B33Y 30/00* (2014.12); *B33Y 70/00* (2014.12); *B29C 2035/0822* (2013.01); *B29C 2035/0827* (2013.01); *B29C 2035/0855* (2013.01); *B29C 2035/0861* (2013.01); *B29K 2071/00* (2013.01); *B29K 2073/00* (2013.01); *B29K 2075/00* (2013.01); *B29K 2995/002* (2013.01); *Y10T 428/24802* (2015.01); *Y10T 428/24901* (2015.01); *Y10T 428/24917* (2015.01)

(56) References Cited

U.S. PATENT DOCUMENTS

| | | |
|---|---|---|
| 4,571,599 A | 2/1986 | Rezanka |
| 4,575,330 A | 3/1986 | Hull |
| 4,584,590 A | 4/1986 | Fischbeck et al. |
| 4,665,492 A | 5/1987 | Masters |
| 4,749,347 A | 6/1988 | Valavaara |
| 4,752,352 A | 6/1988 | Feygin |
| 4,752,498 A | 6/1988 | Fudim |
| 4,829,324 A | 5/1989 | Drake et al. |
| 4,863,538 A | 9/1989 | Deckard |
| 4,887,100 A | 12/1989 | Michaelis et al. |
| 4,938,816 A | 7/1990 | Beaman et al. |
| 5,015,312 A | 5/1991 | Kinzie |
| 5,016,028 A | 5/1991 | Temple |
| 5,059,266 A | 10/1991 | Yamane et al. |
| 5,065,170 A | 11/1991 | Rezanka et al. |
| 5,121,329 A | 6/1992 | Crump |
| 5,136,515 A | 8/1992 | Helinski |
| 5,140,937 A | 8/1992 | Yamane et al. |
| 5,171,360 A | 12/1992 | Orme et al. |
| 5,204,055 A | 4/1993 | Sachs et al. |
| 5,216,616 A | 6/1993 | Masters |
| 5,226,948 A | 7/1993 | Orme et al. |
| 5,234,636 A | 8/1993 | Hull et al. |
| 5,247,180 A | 9/1993 | Mitcham et al. |
| 5,257,657 A | 11/1993 | Gore |
| 5,259,593 A | 11/1993 | Orme et al. |
| 5,301,863 A | 4/1994 | Prinz et al. |
| 5,303,141 A | 4/1994 | Batchelder et al. |
| 5,340,090 A | 8/1994 | Orme et al. |
| 5,340,656 A | 8/1994 | Sachs et al. |
| 5,354,414 A | 10/1994 | Feygin |
| 5,387,380 A | 2/1995 | Cima et al. |
| 5,402,162 A | 3/1995 | Fusting et al. |
| 5,402,351 A | 3/1995 | Batchelder et al. |
| 5,490,882 A | 2/1996 | Sachs et al. |
| 5,506,607 A | 4/1996 | Sanders, Jr. et al. |
| 5,514,232 A | 5/1996 | Burns |
| 5,555,176 A | 9/1996 | Menhennett et al. |
| 5,617,911 A | 4/1997 | Sterett et al. |
| 5,637,175 A | 6/1997 | Feygin et al. |
| 5,669,433 A | 9/1997 | Sterett et al. |
| 5,718,951 A | 2/1998 | Sterett et al. |
| 5,738,817 A | 4/1998 | Danforth et al. |
| 5,740,051 A | 4/1998 | Sanders, Jr. et al. |
| 5,746,844 A | 5/1998 | Sterett et al. |
| 5,879,489 A | 3/1999 | Burns et al. |
| 5,905,477 A | 5/1999 | Kuwayama et al. |
| 6,129,872 A | 10/2000 | Jang |
| 6,165,406 A | 12/2000 | Jang et al. |
| 6,259,962 B1 | 7/2001 | Gothait |
| 6,658,314 B1 | 12/2003 | Gothait |
| 6,685,866 B2 | 2/2004 | Swanson et al. |
| 6,722,872 B1 | 4/2004 | Swanson et al. |
| 7,991,498 B2 | 8/2011 | Kritchman |
| 9,227,366 B2 | 1/2016 | Giller |
| 9,259,323 B2 | 2/2016 | Castro |
| 9,412,618 B2 | 8/2016 | Morikita et al. |
| 2002/0171177 A1 | 11/2002 | Kritchman et al. |
| 2004/0207124 A1 | 10/2004 | Kritchman et al. |
| 2004/0251574 A1 | 12/2004 | Collins et al. |
| 2004/0254574 A1 | 12/2004 | Morrison et al. |
| 2005/0072519 A1 | 4/2005 | Johnson et al. |
| 2006/0061613 A1* | 3/2006 | Fienup ............... B41J 2/16532 347/19 |
| 2007/0108664 A1 | 5/2007 | Luan |
| 2007/0229497 A1 | 10/2007 | Zinniel et al. |
| 2010/0195122 A1 | 8/2010 | Kritchman |
| 2011/0249048 A1 | 10/2011 | Gullentops et al. |
| 2015/0121652 A1 | 5/2015 | Minato et al. |

FOREIGN PATENT DOCUMENTS

| | | |
|---|---|---|
| DE | 10033794 C1 | 1/2002 |
| EP | 1925428 A1 | 5/2008 |
| JP | 61-041119 | 2/1986 |
| JP | H06-078929 B2 | 11/1994 |
| JP | 07-088967 | 4/1995 |
| JP | 08-208154 | 8/1996 |
| JP | 09-024552 | 1/1997 |
| JP | 2000225647 A | 8/2000 |
| JP | 2000-334846 A | 12/2000 |
| JP | 200118297 A | 1/2001 |
| JP | 2001347572 A | 12/2001 |
| JP | 2002001828 A | 1/2002 |
| JP | 2002-516346 A | 6/2002 |
| JP | 2004255839 A | 9/2004 |
| JP | 2005050969 A | 2/2005 |
| JP | 2005059324 A | 3/2005 |
| JP | 2006192710 A | 7/2006 |
| JP | 2008507619 A | 3/2008 |
| JP | 2008-201074 A | 9/2008 |
| JP | 2008-538329 A | 12/2008 |
| JP | 2009532243 A | 9/2009 |
| JP | 2010022251 A | 2/2010 |
| JP | 2010-530326 A | 9/2010 |
| JP | 2010-228316 A | 10/2010 |
| JP | 2015221568 A | 12/2015 |
| WO | WO-98/09798 A1 | 3/1998 |
| WO | WO-1999/060507 A1 | 11/1999 |
| WO | WO-2006/078342 A2 | 7/2006 |
| WO | WO-2007/130220 A2 | 11/2007 |

(56) References Cited

FOREIGN PATENT DOCUMENTS

| WO | WO-2008/103450 A2 | 8/2008 |
|----|-------------------|--------|
| WO | 2012058278 A2     | 5/2012 |
| WO | WO-2012/058278 A2 | 5/2012 |

OTHER PUBLICATIONS

International Search Report and Written Opinion dated May 23, 2012, issued from corresponding PCT/US2011/057837.
Notice of Allowance and Fee(s) Due in U.S. Appl. No. 13/881,554, dated Nov. 12, 2015.
Non-final Office Action in U.S. Appl. No. 13/881,554, dated Sep. 4, 2015.
English Translation of the Office Action issued in corresponding Korean Application No. 10-2013-7009540, dated Apr. 2014.
Baek (2015) "Introduction of 3D printing technology & applications", Korean Industrial Chemistry News, 18(1):2-10.
First Office Action corresponding to Chinese Patent Application No. 2017100805875, dated Aug. 28, 2018, 13 pages.
International Preliminary Report on Patentability corresponding to International Patent Application No. PCT/US2011/057837, dated Apr. 30, 2013, 8 pages.
Kinpo Group (2011) "3D Printer Product Line", 1 page. Accessible on the Internet at URL: http://www.calcomp.com.tw/english/pro_3d.html.
KYZprinting, Inc. (2018) "XYZ Printing", 3 pages. Accessible on the Internet at URL: https://www.xyzprinting.com/ko-KR/.
Miller-Chou, et al., (2003) "A review of polymer dissolution", Progress in Polymer Science, 28(8):1223-1270.
European Examination Report issued in corresponding European Application No. 11781918.5, dated Jun. 5, 2013.
Office Action issued in corresponding Japanese Application No. 2013-536772, dated Mar. 19, 2014.
English Translation of the Office Action issued in corresponding Japanese Application No. 2013-536772, dated Mar. 19, 2014.
Office Action issued in corresponding Korean Application No. 10-2013-7009540, dated Apr. 8, 2014.
English Translation of the Office Action issued in corresponding Korean Application No. 10-2013-7009540, dated Apr. 8, 2014.

\* cited by examiner

Axes:
  δd – dispersion Hansen parameter
  δp – polar Hansen parameter
  δh – hydrogen bond Hansen parameter

PROCESS AND APPARATUS FOR FABRICATION OF THREE DIMENSIONAL OBJECTS

CROSS-REFERENCE TO RELATED APPLICATIONS

This application is a continuation of and claims priority under 35 U.S.C. § 120 to U.S. application Ser. No. 14/965,470, filed Dec. 10, 2015, allowed, which is a continuation of and claims priority under 35 U.S.C. § 120 to U.S. application Ser. No. 13/881,554 filed on Feb. 27, 2014 and issued as U.S. Pat. No. 9,227,366, which is a national stage application, filed under 35 U.S.C. § 371, of International Application No. PCT/US2011/057837, filed on Oct. 26, 2011, which claims priority under 35 U.S.C. § 119(e) to, and benefit of U.S. Provisional Application No. 61/451,350, filed on Mar. 10, 2011 and U.S. Provisional Application No. 61/407,401, filed on Oct. 27, 2010, each of which is herein incorporated by reference in its entirety.

FIELD OF THE INVENTION

This disclosure relates to a method and apparatus for fabricating three-dimensional objects from polymer based material. In particular, this invention relates to a three-dimensional fabrication apparatus having a print head and ink delivery system.

BACKGROUND OF TIE INVENTION

With the increased use of Computer Aided Design (CAD) solid modeling systems a new frontier of manufacturing technology has emerged that enables translation of the CAD output data into a three-dimensional physical object. This technology is commonly referred to as solid freeform fabrication or layer manufacturing, which entails building an object on a layer-by-layer and point-by-point basis. Examples of commercially available solid freeform fabrication systems include stereo lithography, selective laser sintering, laminated object manufacturing, and fused deposition modeling. Other examples of solid freeform fabrication systems are known to those of skill in the art.

Forming objects automatically in three dimensions is useful in verifying CAD databases, assessing aesthetics, checking ergonomics of design, aiding in tool and fixture design, creating conceptual models and sales/marketing tools, generating patterns for investment casting, reducing or eliminating engineering changes in production, and providing small production runs.

SUMMARY

Aspects of the invention are directed to fabrication of three-dimensional objects. The three-dimensional objects may have high-resolution color.

In accordance with a first aspect of the invention, a three-dimensional fabrication method includes (a) depositing a first polymer layer; (b) printing a first ink layer on to the first polymer layer; (c) printing a second polymer layer on to the first ink layer; (d) depositing a second ink layer on to the second polymer layer.

In certain embodiments the first and the second ink layer may each include a plurality of ink layers. In certain embodiments the first and second polymer layer may each include a plurality of polymer layers. In certain embodiments forming at least one of the first and second ink layers may include utilizing an ink comprising at least one of pigments, dyes, and catalysts. In certain embodiments the catalysts may be electroless metallization catalysts. In some embodiments the electroless metallization catalysts may be selected from the group including palladium, ruthenium, platinum, silver, osmium, iridium, and cobalt. In certain embodiments the electroless metallization catalyst is palladium or silver. In certain embodiments forming at least one of the first and second ink layers includes utilizing a color ink. In certain embodiments at least one of the first and second ink layers is deposited along a circumferential edge of at least one of the first and second polymer layers. In certain embodiments forming at least one of the first and second ink layers may include utilizing an ink that is selected based on its solubility parameter in relation to a polymer solubility parameter.

In certain embodiments, forming at least one of the first and second polymer layers includes utilizing a polymeric material selected from acrylonitrile butadiene styrene, polyacrylates, polyolefins, cyclic olefin polymers and copolymers, polycarbonates, polyamides, polyimides, polyethylene and polybutylene terephthalate, liquid crystal polymer resins, polyether ether ketone, thermoplastic elastomers, polystyrenes, polyvinyl chloride, polysulfones, polyurethanes, polyamides, polyesters, epoxy resins, silicon resin, a diallyl phthalate resin, a cellulosic plastic, a rosin-modified maleic acid resin, copolymers thereof, collagen, elastin, hydrogels, xerogels, polycaprolactone, poly$(_{D,L}$-lactide-co-glycolide), polylactide, poly(lactide-co-caprolactone), or combinations thereof. In certain exemplary embodiments, forming at least one of the first and second polymer layers includes utilizing acrylonitrile butadiene styrene ("ABS").

In certain embodiments, the three-dimensional fabrication method further includes repeating steps (a)-(d) until a three-dimensional object is complete. In some embodiments a support structure is formed adjacent to the three-dimensional object during the fabrication process. In certain embodiments the support structure may be removed from the three-dimensional object. In some embodiments a releasable ink layer may be printed between the three dimensional object and the support structure. In certain embodiments forming the support structure may include utilizing a polymeric material that is similar to a polymeric material used to form the three-dimensional object. In some embodiments the polymeric material may be a water soluble, solvent soluble, or alkali soluble polymer. In some embodiments the support structure has an external ink layer that includes at least one ingredient that is soluble in a polymeric material included in the support structure. In certain embodiments the at least one ingredient accelerates dissolution of the polymeric material of the support structure, or in alternative embodiments, the at least one ingredient causes the external ink layer to dissolve prior to the dissolution of the polymeric material of the support structure.

In certain embodiments an overcoat layer is applied to at least one of the first and second ink layers. In some embodiments the overcoat layer is a lacquer. In some embodiments the overcoat layer is applied to the three-dimensional object. In some embodiments the overcoat layer is a translucent or transparent polymeric material. In certain embodiments at least one of the first and second ink layers is treated with a heat source, an energy source, or combinations thereof. In some embodiments the heat source may be selected from the group having conventional, conduction, radiant, and combinations thereof. In some embodiments the energy source may be an electromagnetic energy source. In certain embodiments the electromagnetic energy source may be selected from the group having infrared, near infrared, visible, ultraviolet, radiofrequency, microwave, and combinations thereof. In some embodiments the printing of at least one of the first or second ink layers forms a target pattern that may be used to optically align a three-dimensional printing apparatus.

In certain embodiments at least one of the first and second ink layers includes a releasable ink or a plasticizing ink. In certain embodiments forming a first portion of at least one of the first and second ink layers includes utilizing a first ink and a second portion of at least one of the first and second ink layers is formed utilizing a second ink. In some embodiments the first ink is a plasticizing ink and the second ink is a plasticizing ink with a higher concentration of plasticizer than the first ink. In some embodiments the first ink and the second ink provide different surface properties between the first portion and the second portion of the ink layer. In some embodiments forming at least one of the first and second ink layers includes utilizing a plasticizing ink creating a smooth surface on the three-dimensional object. In certain embodiments forming at least one of the first and second ink layers includes utilizing an ink comprising at least one ingredient that is soluble in the first and second polymer layer. In certain embodiments forming at least one of the first and second ink layers includes utilizing an ink comprising an active ingredient. In some embodiments the active ingredient may be a pharmaceutical ingredient including an anti-inflammatory ingredient, an ingredient inhibiting neointimal growth, an anticoagulant, an antibody, an immunosuppressive ingredient, chemotherapeutic drugs, or combinations thereof. In alternative embodiments the active ingredient may be a cell culture including stem cells, cartilage cells, bone cells, muscle cells, skin cells, pancreas cells, kidney cells, liver cells, nerve cells, or combinations thereof.

In accordance with another aspect of the invention, a three-dimensional fabrication apparatus includes: (a) a polymer deposition apparatus; and (b) a printing apparatus including a print head and ink delivery system. In certain embodiments the printing apparatus may be attached to the polymer deposition apparatus. In certain embodiments the polymer deposition apparatus includes an extruder and the print head and ink delivery system is attached to the extruder. In alternative embodiments the polymer deposition apparatus includes an extruder and the print head and ink delivery system is attached to the polymer deposition apparatus separate from the extruder.

In certain embodiments the polymer deposition apparatus is selected from the group having a fusion deposition modeling apparatus, a laminated object manufacturing apparatus, and a photopolymer three-dimensional deposition apparatus. In certain embodiments the print head and ink delivery system includes a print head selected from the group including a thermal print head, a piezo print head, a MEMS print head, and an electrostatic print head. In certain embodiments the print head and ink delivery system includes a print head selected from the group having a plotter-style single nozzle unit, a continuous ink jet, and a drop-on demand system.

In accordance with another aspect of the invention a method for selecting an ink for three-dimensional fabrication of a three-dimensional object includes: (a) selecting a polymer; (b) calculating the polymer's Hansen solubility parameter; (c) selecting an ink; (d) calculating the ink's Hansen solubility parameter; (e) comparing the polymer's Hansen solubility parameter to the ink's Hansen solubility parameter to determine if the ink would be a releasable ink or a plasticizing ink; and (f) utilizing the polymer and the ink to form a three-dimensional object by three-dimensional fabrication.

In accordance with another aspect of the invention a three-dimensional fabrication method includes (a) depositing a first polymer layer to form a three-dimensional object; (b) printing an ink layer on to the three-dimensional object to form a shell. In certain embodiments the three-dimensional fabrication method further includes depositing at least one second polymer layer on to the shell. In certain embodiments the second polymer layer is formed utilizing a translucent or transparent polymeric material.

These and other aspects, along with advantages and features of the present invention here disclosed, will become apparent through reference to the following detailed description. Furthermore, it is to be understood that the features of the various embodiments described here are not mutually exclusive and can exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DETAILED DESCRIPTION OF THE INVENTION

It would be desirable to provide a three-dimensional manufacturing method and apparatus that are able to produce a variety of three-dimensional objects. At least certain of the embodiments of the new method and apparatus can provide high-resolution color manipulating capabilities. At least certain of the embodiments of the new method and apparatus can provide functional three-dimensional objects. Additional features and advantages of some or all of the three-dimensional manufacturing methods and apparatuses disclosed here will be apparent to those who are skilled in three-dimensional manufacturing given the benefit of the following summary and description of exemplary, non-limiting examples.

The present invention provides a method and apparatus for fabricating a three-dimensional object.

As used here, "three-dimensional fabrication" is used to refer to the method of building a three-dimensional object layer-by-layer. Three-dimensional fabrication refers to the combination of depositing at least one layer of a polymer and printing at least one layer of an ink to form a three-dimensional object. As used here, a "layer" is formed by a single pass of a deposition apparatus or a printing apparatus. In some embodiments the at least one polymer layer and at least one ink layer may be deposited and printed in any order. For example, in certain embodiments, multiple polymer layers may be deposited prior to an ink layer being printed. In alternative embodiments the polymer and ink layers may alternate by individual or multiple layers. Various deposition methods are known in the art, including, but not limited to, fused deposition modeling, laminated object manufacturing, stereo lithography, and selective laser sintering.

In certain embodiments a three-dimensional deposition apparatus, such as that used for fused deposition modeling, includes an extruder assembly that dispenses a polymer. In some embodiments the polymer forms a three-dimensional object in a layer-by-layer process on a build platform. In some embodiments once the build of the three-dimensional object is complete, the object may be removed from the build platform and a new project may begin. In certain embodiments the extruder assembly may be stationary, or may allow for movement in the XY axes, for movement in the X axis or Y axis only, and/or for rotational or angular movements. In certain embodiments the build platform generally has indexed movement options in the Z axis. In alternative embodiments other movements may also be provided. In certain embodiments each movement in the Z axis may correspond to a specific layer thickness for the manufacture of a three-dimensional object. In addition, in certain embodiments the build platform may allow for optional movement in the XY axes, for movement in the X axis or Y axis only, and/or for rotational or angular movements.

Figure 1:
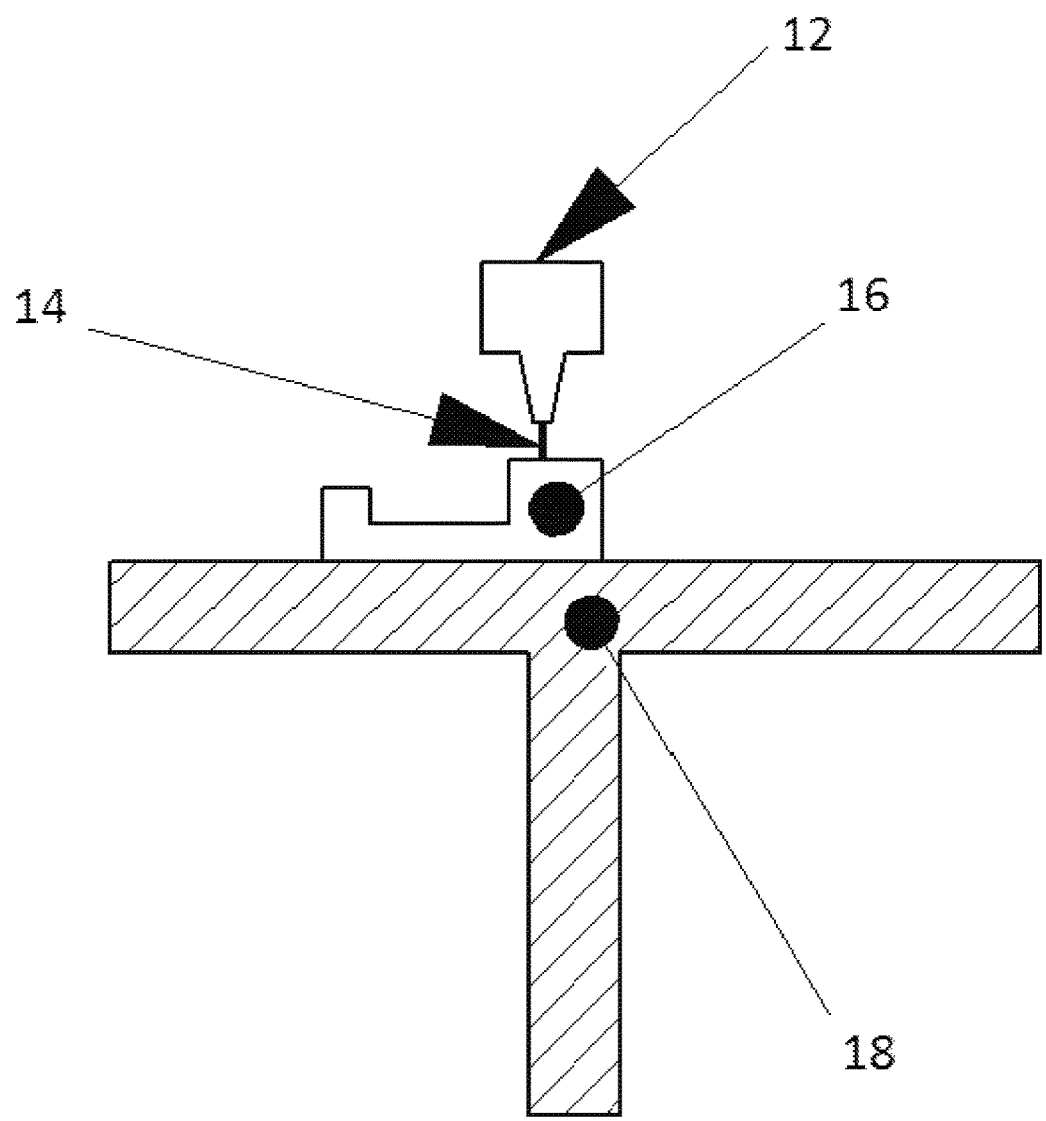
FIG. 1 depicts a schematic configuration of a prior art Filament Deposition Modeling apparatus.

A known fused deposition modeling apparatus is shown in FIG. 1. Extruder assembly 12 dispenses polymer 14 onto build platform 18, in a layer-by-layer process, to form three-dimensional object 16. Once three-dimensional object 16 is completed it may be removed from build platform 18 and a new project may begin.

In certain embodiments of the present invention, a three-dimensional fabrication apparatus includes a deposition apparatus and a printing apparatus. In some embodiments the deposition apparatus may be similar to that used for fused deposition modeling. In some embodiments the deposition apparatus includes an extruder assembly that dispenses a polymer. In certain embodiments the polymer forms a three-dimensional object in a layer-by-layer process on a build platform. In certain embodiments the printing apparatus includes a print head and ink delivery system for depositing various inks during production of any three-dimensional objects using the three-dimensional fabrication apparatus. In some embodiments the extruder head may be stationary, or may allow for movement in the XY axes, for movement in the X axis or Y axis only, and/or for rotational or angular movements. In certain embodiments the build platform generally has indexed movement options in the Z axis. Additionally, in certain embodiments the build platform may allow for optional movement in the XY axes, for movement in the X axis or Y axis only, and/or for rotational or angular movements.

In some embodiments, as the three-dimensional object is fabricated, the print head and ink delivery system may deposit inks in a layer-by-layer fashion. In certain embodiments the inks may be color inks and/or functional inks. In certain embodiments the print head and ink delivery system may be stationary, or in alternative embodiments, may allow for movement in the XY axes, for movement in the X axis or Y axis only, and/or for rotational or angular movements. In certain embodiments the printing of the inks may be triggered by an optical limit switch or a linear encoder.

Figure 2:
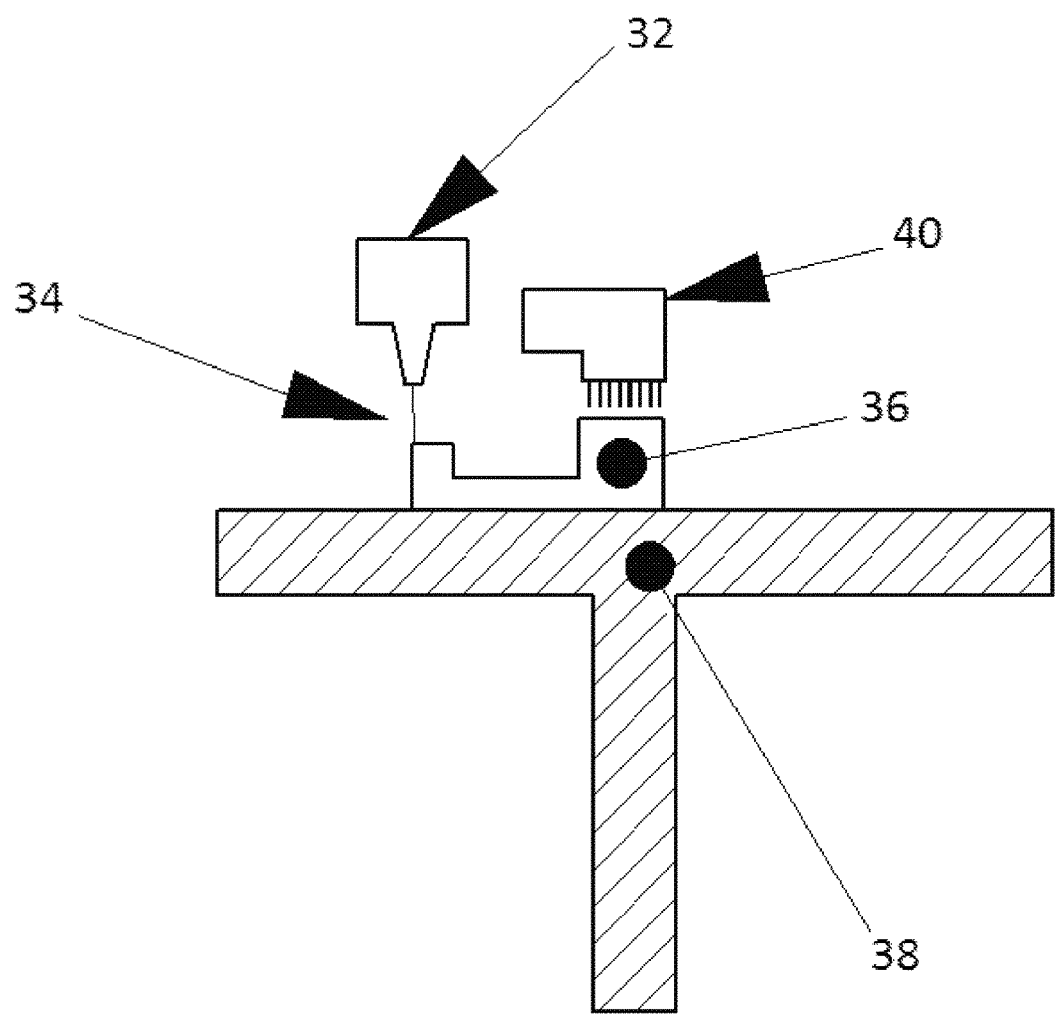
FIG. 2 depicts a schematic configuration of a fabrication apparatus according to an aspect of the present invention.

A schematic of a three-dimensional fabrication apparatus, including a deposition apparatus similar to that used for fused deposition modeling and a printing apparatus having a print head and ink delivery system, is provided in FIG. 2. A three-dimensional fabrication apparatus includes extruder assembly 32 that dispenses polymer 34, in a layer-by-layer process, to form three-dimensional object 36 on build platform 38. In addition, the fabrication apparatus includes print head and ink delivery system 40, which dispenses ink on three-dimensional object 36, in a layer-by-layer process, during the build process.

In certain embodiments the printing apparatus having the print head and ink delivery system is attached to the same mechanism as the deposition apparatus having the extruder, such that it travels with the deposition apparatus. In alternative embodiments the printing apparatus is attached to an independent moving or stationary mechanism that is attached to the three-dimensional fabrication apparatus. In alternative embodiments the printing apparatus is aligned with the deposition apparatus, but not attached to the deposition apparatus. In certain embodiments the printing apparatus includes a print head(s) that may be, for example, a piezoelectric print head, a thermal print head, a MEMS print head, an electrostatic print head, or combinations thereof. In alternative embodiments the printing apparatus includes a print head that may be a plotter type single nozzle unit, a continuous ink jet, or a drop on demand system. In certain embodiments the print head of the printing apparatus may be positioned at any angle within the range of +45 to −45 degrees relative to the extruder of the deposition apparatus.

In alternative embodiments printing apparatus is paired with any solid freeform fabrication apparatus that builds three-dimensional polymer objects by utilizing a layer-by-layer build process. Non-limiting examples of such apparatuses include a laminated object manufacturing apparatus or a three-dimensional photopolymer apparatus.

In certain embodiments of the invention a three-dimensional fabrication method includes depositing a first polymer layer, printing a first ink layer on to the first polymer layer, depositing a second polymer layer on to the first ink layer, and printing a second ink layer on to the second polymer layer. In some embodiments the fabrication process may be repeated until a completed three-dimensional object is formed. In certain embodiments the first and second polymer layer may each include a plurality of polymer layers. The plurality of polymer layers forming a first (or second) polymer layer need not all be formed of the same polymer, but may include one or more distinct polymers. In certain embodiments the first and second ink layer may each include a plurality of ink layers. The plurality of ink layers forming a first (or second) ink layer need not all be formed of the same ink, but may include one or more distinct inks. In certain embodiments the polymer layers and ink layers may be deposited in varying number and in varying order when fabricating a three-dimensional object. Further, the polymer layers and/or the ink layers need not extend completely over the previously deposited layer. In some instances, an ink layer may be deposited only over a portion of the previously deposited polymer (or ink) layer. For example, an ink layer may be encapsulated between two surrounding polymer layers. In certain embodiments the printing or depositing of one layer onto another may cause the two layers to bind to one another. In some embodiments the binding of one layer to another means the layers do not separate from one another during the build process. In some embodiments an ink layer printed between two polymer layers may have at least one ingredient that is soluble in the polymeric material of the two polymer layers and causes a bond to form between the two polymer layers in binding to one another. In certain embodiments an ink layer may be printed on a completed three-dimensional object to form a coating. In certain embodiments the coating may act as a shell having a thickness of, for example, 0.01-5 mm. In certain embodiments an overcoat layer may be applied to an ink layer. In some embodiments the overcoat layer may be a lacquer, and in alternative embodiments, may be a translucent or transparent polymer.

In certain embodiments an ink layer may be printed along the perimeter edge of a polymer layer. In some embodiments the ink layer includes an ink that diffuses into the perimeter edge of the polymer layer. In certain embodiments the perimeter ink layer may be printed on a polymer where the polymer includes a transparent or translucent polymeric material. In some embodiments the perimeter ink layer printed on a transparent or translucent polymer may create an optical illusion such that it appears the ink layer extends into the polymer layer. In certain embodiments an additional polymeric layer may be applied to the perimeter of the ink layer, thereby providing protection from delamination or scratching, where the polymeric material may include a transparent or translucent polymeric material.

The three-dimensional fabrication method may be utilized in certain embodiments to optically align the three-dimensional fabrication apparatus. In certain embodiments an ink layer pattern, such as, for example, a target pattern, is printed on one or several layers of a sacrificial three-dimensional object or innocuously printed on any three-dimensional object. In some embodiments the ink layer pattern is scanned with an optical sensor and the results of an optical alignment test are used to position the print head and ink jet delivery system as well as the extruder relative to the three-dimensional object.

In certain embodiments a layer of polymer may be deposited fully prior to a layer of ink being printed onto the layer of polymer. In alternative embodiments while the polymer is in the process of being deposited, a layer of ink may be printed onto the same layer of polymer. In some embodiments a first portion of at least one ink layer may include a first ink and a second portion of the at least one ink layer may include a second ink. In certain embodiments a first portion of at least one polymer layer may include a first polymeric material and a second portion of the at least one polymeric layer may include a second polymeric material.

Figure 3:
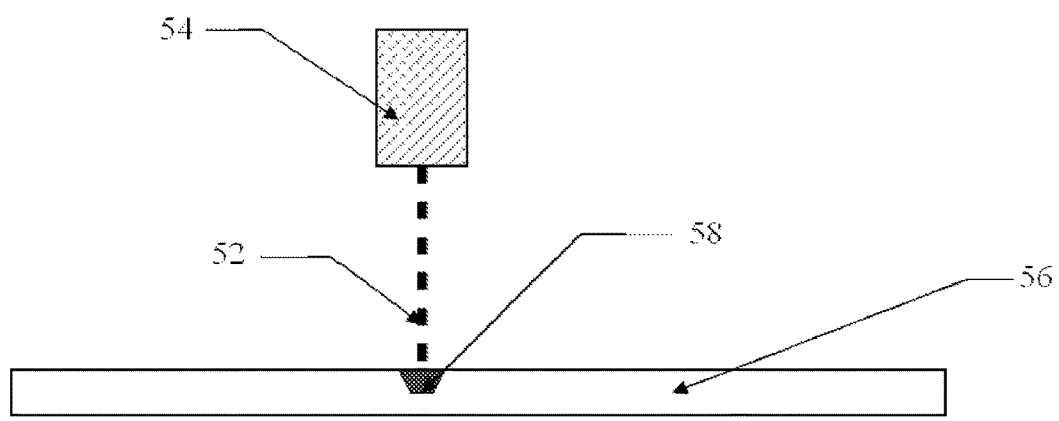
FIG. 3 depicts a schematic configuration of a fabrication process according to an aspect of the present invention.
Figure 4:
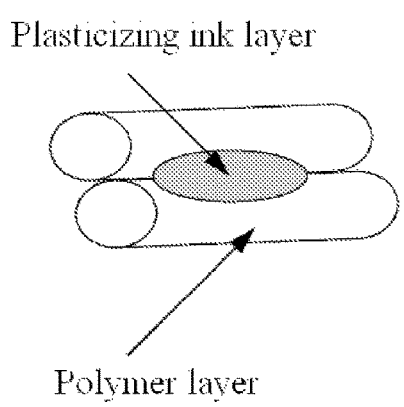
FIG. 4 depicts a schematic representation of a plasticizing ink between two polymer layers.
Figure 5:
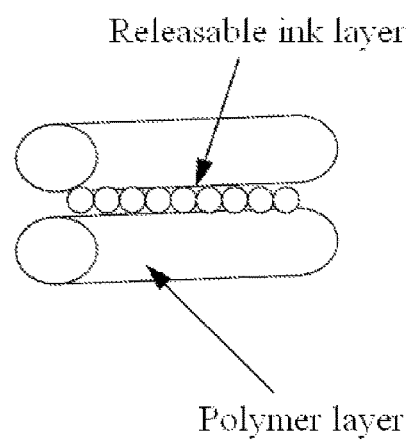
FIG. 5 depicts a schematic representation of a releasable ink between two polymer layers.
Figure 6:
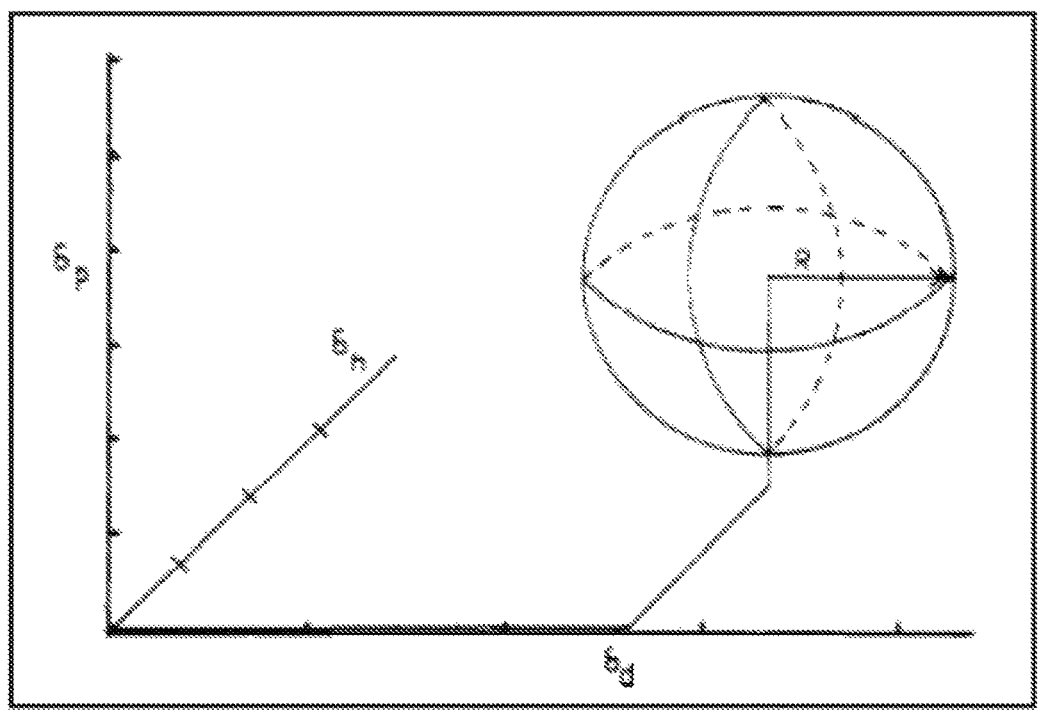
FIG. 6 depicts a graphic representation of the interaction of an ink and a polymer as defined by the equation $D_{(I-P)}=[4(\delta_d i-\delta_d p)^2+(\delta_p i-\delta_p p)^2+(\delta_h i-\delta_h p)^2]^{0.5}$.

A schematic of a three-dimensional fabrication process is provided in FIG. 3. An ink layer is formed on a polymer layer by having print head and ink delivery system 54 deposit ink droplets 52, optionally including dyes or pigments, onto polymer 56. Ink droplets 52 form interaction area 58 where the ink contacts polymer 56.

In certain embodiments a support structure is formed adjacent to, or attached to, a three-dimensional object during the three-dimensional fabrication process. In certain embodiments the three-dimensional apparatus is formed from a polymeric material. In some embodiments the deposition apparatus is used to form the support structure. In alternative embodiments a second deposition apparatus is used to form the support structure. In certain embodiments the support structure is removable from the three-dimensional object. In certain embodiments a releasable ink layer is printed between the three-dimensional object and the support structure. In some embodiments the releasable ink layer may be printed on the three-dimensional object only at the location where the support structure is attached. In certain embodiments the support structure may be broken into smaller pieces for removal.

In certain embodiments a polymeric material of the support structure is similar to, or in some embodiments is the same as, a polymeric material used to form the three-dimensional object. The support structure and/or the three-dimensional object may be formed of one or more polymeric materials. In some embodiments the support structure may include a polymeric material that is a water soluble, solvent soluble, or alkali soluble polymer, such as, for example water soluble wax, polyethylene oxide and glycol-based polymers, polyvinyl pyrrolidone-based polymers, methyl vinyl ether, or maleic acid-based polymers.

In some embodiments the support structure may have an external ink layer. In certain embodiments the external ink layer has at least one ingredient that is soluble in a polymeric material included in the support structure. In some embodiments the at least one ingredient in the polymeric material may accelerate dissolution of the polymeric material. In certain embodiments the at least one ingredient, may be, for example, low molecular weight compounds, such as, polyethylene glycols, polypropylene glycols, polyalkylene glycols, or polyethylene oxide. In alternative embodiments the at least one ingredient in the polymeric material causes the external ink layer to dissolve prior to the dissolution of the polymeric material of the support structure. In some embodiments the at least one ingredient, may be, for example, salts such as potassium chloride, potassium oxalate, or sodium citrate, low molecular weight water soluble polymers such as polyvinyl alcohols, or polyethylene oxides or water soluble organic compounds such as dimethyl urea, or propylene glycol.

In certain embodiments at least one of the polymer layers may include a polymeric material, such as, for example, acrylonitrile butadiene styrene ("ABS"), polyacrylates, polyolefins, cyclic olefin polymers and copolymers, polycarbonates, polyamides, polyimides, polyethylene and polybutylene terephthalate, liquid crystal polymer resins ("LCP"), polyether ether ketone ("PEEK"), thermoplastic elastomers ("TPE"), polystyrenes, polyvinyl chloride, polysulfones, polyacrylates, polyurethanes, polyamides, polyesters, polyolefins, epoxy resins, silicon resin, a diallyl phthalate resin, a cellulosic plastic, a rosin-modified maleic acid resin, copolymers thereof, any other macromolecular structure, and combinations thereof. In certain embodiments the polymer is acrylonitrile butadiene styrene. In certain embodiments the polymer layer may include a biocompatible or biodegradable polymeric material, such as, for example, collagen, elastin, hydrogels, xerogels, proteins, peptides, or a combination of any of them. In some embodiments the polymer layer may include a synthetic polymer, such as, for example, polycaprolactone ("PCL"), poly($_{D,L}$-lactide-co-glycolide) ("PLGA"), polyactide ("PLA"), poly (lactide-co-caprolactone) ("PLCL"), or a combination of any of them.

In certain embodiments the first polymer layer is wetted by application of the first ink layer. In certain embodiments the ink of the first ink layer is a plasticizing or soluble ink that may be diffused into the first polymer layer(s). In certain embodiments to obtain improved wetting characteristics, the polymer and ink layers may be treated with plasma or corona discharge. In some embodiments the layers may be treated by passing the source of the discharge above the surface of the layers at, for example, a 1-5 mm distance.

In certain embodiments the print head and ink delivery system of the printing apparatus prints an ink layer. In certain embodiments at least one of the ink layers includes an ink having, for example, dyes, pigments, and/or catalysts. In some embodiments the ink is a color ink. In certain embodiments the catalysts may be electroless metallization catalysts. In certain embodiments the electroless metallization may be, for example, a salt, or an organometallic complex of palladium, ruthenium, platinum, silver, osmium, iridium, or cobalt. In some embodiments other metals of Groups 8, 9, 10, and 11 of the Chemical Periodic Table are within the scope of this invention. In certain embodiments the ink may include an electroless metallization catalyst that is silver or palladium.

In some embodiments the ink, the polymeric material, or both the ink and the polymeric material may include an active ingredient. In some embodiments the active ingredient may be, for example, an active pharmaceutical ingredient or a cell culture. In certain embodiments an active pharmaceutical ingredient, may be, for example, an anti-inflammatory ingredient, such as, for example, corticosteroids, diclofenac sodium, aspirin, ibuprofen, or acetaminophen; an ingredient inhibiting neointimal growth, such as, for example, everolimus, paclitaxel, or zotarolimus; an anti-coagulant, such as, warfarin, heparin, fondaparinux, ximelagatran, or batroxobin; an immunosuppressive ingredient, such as, for example, ciclosporin, tacrolimus, sirolimus, or mycophenolic acid; an antibody, such as, for example, monoclonal anti-IL-2Rα receptor antibodies, polyclonal anti-T-cell antibodies, anti-thymocyte globulin ("ATG"), or anti-lymphocyte globulin ("ALG"); or chemotherapeutic drugs, such as, for example, alkylating agents, antimetabolites, plant alkaloids, or topoisomerase inhibitors; or a combination of any of them. In some embodiments a cell culture may include, for example, stem cells, cartilage cells, bone cells, muscle cells, skin cells, pancreas cells, kidney cells, liver cells, nerve cells, or a combination of any of them. In some embodiments a cell culture may be a live cell culture.

In some embodiments a single ink or polymer layer having an active ingredient may be printed/deposited. In alternative embodiments a number of ink or polymer layers may be printed in a row. It is currently understood that by varying the number of ink or polymer layers having an active ingredient, the concentration and/or amount of the active ingredient on the three-dimensional object may be varied. In certain embodiments an ink layer is formed utilizing an ink including a cell culture on a polymer layer formed utilizing a biocompatible or biodegradable polymer. In some embodiments an ink layer formed utilizing an ink including a cell culture may form live tissue on a biocompatible or biodegradable polymer. In certain embodiments the live tissue will correspond to the type of cells in the cell culture.

In certain embodiments the ink may have a viscosity within the range of 1 to 150 cps, within the range of 1 to 50 cps, or within the range of 1 to 22 cps, at a temperature of 25° C. In certain embodiments the ink may have a surface tension within the range of 18 to 72 dynes/cm, within the range of 20 to 40 dynes/cm, or within the range of 22 to 33 dynes/cm, at a temperature of 25° C.

In certain embodiments the ink may be individually selected based on the solubility parameter of the ink and the solubility parameter of the polymer of the three-dimensional object. It is currently understood that solubility parameters, also known as Hildebrand solubility parameters ($\delta$) and Hansen solubility parameters, are a result of various intermolecular forces, including the energy of dispersion bonds ($\delta_d$), dipole-dipole intermolecular force ($\delta_p$), and hydrogen bonding ($\delta_h$). Specific Hildebrand solubility parameters may be calculated using the equation:

$$\delta = (\delta_d^2 + \delta_p^2 + \delta_h^2)^{0.5} \quad \text{(Equation 1)}$$

If two materials have similar Hildebrand solubility parameters it is likely that they will be able to interact with each other. In some embodiments the Hansen solubility parameters of the two materials may be used to determine if one material will dissolve in the other, such as a polymer into a solvent or an ink. A value called an interaction radius ($R_O$) is given to the material to be dissolved. The interaction radius of the material to be dissolved, such as a polymer, may define a sphere in Hansen space. If the second material, such as an ink, is within the sphere defined by the interaction radius then the polymer may be considered to dissolve into the ink. The sphere is defined by the equation:

$$D_{(I-P)} = [4(\delta_d i - \delta_d p)^2 + (\delta_p i - \delta_p p)^2 + (\delta_h i - \delta_h p)^2]^{0.5} \quad \text{(Equation 2)}$$

where: $D_{(I-P)}$ is the distance between the ink and the center of the polymer solubility sphere; $\delta_x i$ is the Hansen component (as defined above) for an ink; $\delta_x p$ is the Hansen component (as defined above) for the polymer.

In certain embodiments a specific ink may be selected based on its solubility interaction with the specific polymer utilized for the three-dimensional object. In some embodiments the solubility of the ink in the polymer may be enhanced by utilizing heat or energy sources. In certain embodiments enhanced solubility in the ink provides additional benefits, including, for example, enhancing the drying characteristics of the ink. In certain embodiments the heat source may be, for example, conventional heat, conduction, radiant, or combinations thereof. In certain embodiments the heat or energy source is applied after the three-dimensional object is fabricated. In alternative embodiments the heat or energy source is applied during fabrication of the three-dimensional object. In alternative embodiments, for example, the energy source may be an electromagnetic energy source. In certain embodiments the electromagnetic energy source may be, for example, infrared, near infrared, visible, radiofrequency, microwave, or combinations thereof. Many polymers and inks are transparent in the visible to infrared range, but in certain embodiments the polymer may be supplemented with pigments, dyes, or electroless metallization catalysts that may absorb energy in the same range, thus increasing process efficiency. Additionally, in certain embodiments, various infrared, near infrared, visible energy, microwave, or radiofrequency absorbers may be used to supplement the ink.

In certain embodiments the ink may have a solubility parameter that falls within the radius of interaction, as defined by Equation 2. Inks that have a solubility parameter that fall within the radius of interaction are referred to here as plasticizing inks. In certain embodiments a plasticizing ink may be utilized to provide a color coating or shell, to deliver a functional coating, or to improve surface quality of a three-dimensional polymer object. In certain embodiments the plasticizing ink further includes functional additives including, for example, electroless metallization or other catalysts, antimicrobial agents, or release additives. In certain embodiments the plasticizing ink provides a coating to a three-dimensional polymer object that may be cured. In certain embodiments the coating is a UV curable coating. In some embodiments the curable coating may create a smoother surface on the three-dimensional polymer object by filling in any gaps in an untreated surface of the object.

In certain embodiments three-dimensional polymer objects, formed with a polymer and a plasticizing ink, may be used to produce models for investment casting, also known as lost-wax casting. It is currently understood that in certain embodiments the plasticizing ink allows for a cleaner burnout process during the casting.

In certain embodiments a first portion of at least one of the ink is layers is formed utilizing a plasticizing ink and a second portion of the ink layer is formed utilizing a second plasticizing ink that has a higher concentration of plasticizer than the first ink. In some embodiments a difference in the amount of plasticizer in two different inks can cause a different in the surface or material properties of the ink layer. In some embodiments a three-dimensional object formed utilizing a plasticizing ink having a high concentration of plasticizer may exhibit an increased flexibility as compared to a three-dimensional object formed utilizing an ink that is not a plasticizing ink. In certain embodiments a plasticizing ink creates a smooth surface on a three-dimensional object. It is currently understood that the plasticizing ink dissolves a portion of the surface of a polymer layer thereby creating a smoother surface.

In alternative embodiments the print head and ink delivery system includes an ink that has a solubility parameter that falls outside the radius of interaction, as defined by Equation 2. Inks that have a solubility parameter that fall outside the radius of interaction are referred to here as releasing inks. In certain embodiments releasing inks may be utilized to aid in releasing a support structure from a three-dimensional polymer object. In alternative embodiments releasing inks may provide a shell on a three-dimensional object. In some embodiments the releasing inks may further include, for example, dyes, pigments, or catalysts to be utilized in forming the shell. In certain embodiments the shell may be a color shell. In certain embodiments three-dimensional objects with a color shell of releasing ink may be treated with a fixing liquid. In certain embodiments a fixing liquid may be any liquid or solution with a solubility parameter within the radius of interaction as defined by Equation 2. In certain embodiments the fixing process of the color shell on the three-dimensional object may be accelerated by application of, for example, heat, light, or electromagnetic energy. In certain embodiments any volatile components may be evaporated with or without a vacuum.

In alternative embodiments an ink utilized by the three-dimensional fabrication apparatus may have a low binding affinity to the specific polymer that is being utilized to form a three-dimensional object thereby resulting in low adhesion of the ink to the polymer. In certain embodiments if the ink is printed onto the polymer to form a color shell, at least one final layer of polymer may be deposited onto the color shell to assist in retaining the ink on the three-dimensional object. In such embodiments, the polymer for the final layer may be, for example, transparent or translucent, and may be selected from the group having acrylates, metharcylates, polycarbonates, poly (acrylonitrile butadiene styrene), polyesters, transparent polyamides, cycloaliphatic olefins polymers and copolymers, styrene acrylonitrile polymer, polyvinyl chloride, epoxies. In certain embodiments a reflective or opaque ink layer may be printed onto the polymer prior to printing the color shell.

In alternative embodiments the low adhesion inks may be printed on the polymer of the three-dimensional object to form an outer color shell and the color shell may then be sprayed with a permanent transparent lacquer to form a coating of lacquer on the color shell. In certain embodiments the lacquer may, for example, protect the outer color shell of the three-dimensional object. In some embodiments the lacquer may be, for example, a fast drying solution of a polymer, such as a translucent or transparent polymer. In certain embodiments the lacquer may be, for example, a solution of nitrocellulose in butyl acetate. In certain alternative embodiments the lacquer may be, for example, a fast curing, thermosetting, UV or IR curable resin.

EXAMPLES

Example 1—Examining Solvent and Plasticizing Inks

A Lexmark 22420 ink jet printer was equipped with thermal print heads to provide good color coverage on flat acrylonitrile butadiene styrene ("ABS"). ABS plates were obtained from McMaster Carr. A color layer was printed onto ABS plates and the adhesion of the color was tested utilizing ASTM Standards D3359 Test for Measuring Adhesion by Tape Test. The results showed that the adhesion of the color layer to the ABS plates was low.

In order to improve the color adhesion, the color coated ABS plates were dipped in tetrahydrofuran, a volatile solvent. The plates were then placed in an oven at 60° C. for 10 minutes. The plates were removed from the oven and the ASTM Standards D3359 Test was repeated. The results showed improved color adhesion to the ABS plates.

The application of a color layer to ABS plates was repeated, but the color coated plates were dipped in propylene carbonate, a non-volatile solvent, instead of volatile tetrahydrofuran. The ABS plates were then placed in the oven at 60° C. for 10 minutes and the color adhesion was tested following the ASTM Standards D3359 Test. The results were similar to the results obtained with the tetrahydrofuran plates.

Example 2—Examining Color Ink Composition

Ink containing 99.8% Diisopropyl Adipate and 0.2% Zonlyl FSO surfactant (DuPont) and trace amount of black dye extracted from a Sharpie were deposited with a fountain pen tip onto ABS plates and ABS 3-D objects produced from ABS on a Dimension 1200 ES printer. The adhesion of the color patterns was tested with, and passed, the ASTM Standards D3359 Test Methods for Measuring Adhesion by Tape Test.

Example 3—Examining Plasticizing Ink

Ink containing 99.8% propylene carbonate and 0.2% Zonlyl FSO surfactant (DuPont) was deposited with a fountain pen tip on a polybutylene terephthalate ("PBT") plate. A second PBT plate was placed on the color coated PBT plate and placed in an oven at 105° C. After 30 minutes the two PBT plates had adhered together. The adhesion of the two plates occurred at a temperature well below PBT's melting temperature of 223° C. The test was repeated with two uncoated PBT plates placed in the oven at 105° C. The plates did not adhere to one another.

Example 4—Examining Releasing Ink

Dodecamethylpentasiloxane liquid was deposited directly onto an ABS plate using a fountain pen tip. The coated ABS plate was then covered with a second, clean, ABS plate and clamped together. The two plates were placed in an oven at 150° C. for 35 minutes. Upon removing the plates from the oven, the two ABS plates were separated easily. The test was repeated with two clean ABS plates clamped together and placed in the oven at 150° C. for 35 minutes. The two plates appeared to sinter to one another.

Example 5—Examining Palladium Based Electroless Catalyst Containing Inks

Ink containing 1.5% by weight of palladium acetate in N-Methylpyrrolidone was deposited with a fountain pen tip in a predetermined pattern onto a PBT plate. The coated plate was placed in an oven at 70° C. for 10 minutes. After the coated PBT plate was removed from the oven, the patterned surface was treated with 2% borane dimethylamine complex (DMAB) aqueous solution for 2 minutes and then washed with distilled water. The treated, coated PBT plates were then submerged in electroless nickel plating solution (Caswell) at a temperature of 90° C. for 25 minutes. The PBT plates developed bright, electrically conductive metal deposits in the patterned area.

Example 6—Examining Silver Based Electroless Catalyst Containing Inks

A catalytic ink was prepared by dissolving 1.0 g of silver nitrate in 99 ml of 40% w/w aqueous solution of tetrahydrofuran. The catalytic ink was deposited in a predetermined pattern using a fountain tip pen onto the surface of the ABS plates. The patterned ABS plates were then placed in an oven at 70° C. for 15 minutes. After the ABS plates were removed from the oven, the patterned surface was treated with 2% borane dimethylamine complex (DMAB) aqueous solution for 2 minutes at 45° C. and then washed with distilled water. The treated, coated ABS plates were then submerged in electroless copper plating solution A (Table 1) at a temperature of 60° C. for 15 minutes. The ABS plates developed bright, electrically conductive metal deposits in the patterned area.

TABLE 1

| 200 mL of electroless copper plating solution | |
|---|---|
| Copper sulfate pentahydrate | 8.00 g |
| Formalin | 20.80 g |
| Sodium hydroxide | 12.50 g |
| Tetrahydroxypropyl ethylenediamine | 12.00 g |
| Triisopropanol amine | 2.00 g |
| Nickel sulfate | 0.03 g |
| Triton X-100 surfactant | 0.02 g |

Example 7—Examining Color-Patterned Adhesion

A Cannon Pixima IP 2702 printer was equipped with thermal inkjet print heads. A color-patterned layer was printed onto ABS plates that were 5 mils (or 1/1000 of an inch) thick, and the adhesion of the color was tested utilizing ASTM Standards D3359 Test for Measuring Adhesion by Tape Test. The results showed that the adhesion of the color-patterned layer to the ABS plates was low.

In order to improve the color adhesion of the color-patterned layer, a color-patterned layer was printed onto 5 mils thick ABS plates, and a second ABS plate was placed onto the printed color layer and the two plates were fused together using a hot electric iron. The image quality appeared to be good on both sides of the ABS plates. The fused ABS plates were subjected to excessive bending and adhesion testing using utilizing ASTM Standards D3359 Test for Measuring Adhesion by Tape Test. The image did not distort during the excessive bending and the showed good adhesion.

Example 8—Examining Color-Patterned Adhesion

A 5 mils thick ABS plate was spray coated with Krylon Flat White Spray Paint and subsequently dried. The Cannon Pixima IP 2702 printer of example 7 was then used to print a color-patterned layer onto a 5 mm thick untreated ABS plate. The color-patterned ABS plate was then placed with the color-patterned side face down on the spray coated ABS plate and sintered with a hot electric iron. The image quality of the color-patterned layer appeared more prominent and sharp than the image produced in Example 7.

Example 9—Examining Color-Patterned Adhesion

The Cannon Pixima IP 2702 printer of example 7 was used to print a color-patterned layer onto a 5 mils thick ABS plate. The image quality was good. The color-patterned side of the ABS plate was then spray coated with Krylon Crystal Clear Acrylic and dried for one hour. After the treated ABS sheets had dried, they were subjected to excessive bending and adhesion testing using scotch tape. The image did not distort during the excessive bending and the showed good adhesion to the ABS plate.

Example 10—Examining Multilayer Color Printing on a Transparent Polymer

A fused deposition modeling machine for forming a three-dimensional object was assembled from the commercially available kit Rap Man USA version 3.1.0. The machine was then equipped with an HP 2.5 evaluation kit, which allows for printing with a thermal inkjet ("TIJ") printhead. The hardware and firmware of the machine was modified so that the TIJ printhead could be used to print ink layers during the layer-by-layer construction of the three-dimensional object. The TIJ printing was triggered by an optical limit switch attached to the X axis of the machine.

A three-dimensional object was formed of PLA polymer, obtained from UltiMachine, South Pittsburgh, Tenn., using the modified machine. The three-dimensional object was 20×20×6 mm and the individual layer thickness was 0.25 mm (24 layers).

Example 10a—Poor Adhesion with Traditional Printing

An image of a cross was printed on the top layer (layer #24) of the three-dimensional PLA polymer object using HP 45 black ink. The image was easily removed from the three-dimensional object with a paper towel.

Example 10b—Printing Below the Surface of a Part

An image of a cross was printed on one layer below the top layer (layer #23) of the three-dimensional PLA polymer object using HP 45 ink. The image was sharp, had good contrast, and the integrity of the image did not change when the surface of the object was rubbed with a paper towel. The image also passed the ASTM Standards D3359 Test.

Example 10c—Printing Along the Z Axis

An image of a cross was printing on multiple layers (layers #3-23) of the three-dimensional PLA polymer object using HP 45 ink. The image was positioned 0.25 mm from the perimeter edge of the three-dimensional object. The image was sharp, had good contrast, and integrity in both the XY and Z axes that did not change when the surface of the object was rubbed with a paper towel. The image also passed the ASTM Standards D3359 Test.

Example 11—Examining Multilayer Color Printing on a Transparent Polymer

A fused deposition modeling machine for forming three dimensional objects was assembled from the commercially available kit Rap Man USA version 3.1.0. The machine was then equipped with an HP 2.5 evaluation kit, which allows for printing with a thermal inkjet ("TIJ") printhead. The hardware and firmware of the machine was modified so that the TIJ printhead could be used to print ink layers during the layer-by-layer construction of a three dimensional object. The TIJ printing was triggered by a linear encoder attached to the X axis of the machine.

What is claimed is:

1. A system comprising:
   an extruder assembly configured to extrude a first polymer layer; and
   an ink printing apparatus comprising a print head and ink delivery system, the ink printing apparatus configured to print a first ink layer on to the first polymer layer;
   wherein the extruder assembly is further configured to extrude a second polymer layer on to the first ink layer;
   wherein the ink printing apparatus is further configured to print a second ink layer on to the second polymer layer;
   wherein the system is configured to repeat extrusion of polymer and printing of ink to form a three-dimensional object.

2. The system of claim 1, wherein at least one of the first ink layer and the second ink layer includes an ink comprising at least one of pigments, dyes, catalysts, plasticizers, or active ingredients.

3. The system of claim 1, wherein at least one of the first ink layer and the second ink layer includes a color ink.

4. The system of claim 1, wherein at least one of the first ink layer and the second ink layer includes an ink, and wherein the ink is a plasticizing ink or a releasable ink.

5. The system of claim 1, wherein at least one of the first ink layer and the second ink layer and at least one of the first polymer layer and the second polymer layer are treated with an energy source during fabrication of the three-dimensional object.

6. The system of claim 1, wherein the first ink layer and the second ink layer provide different surface properties to the three-dimensional object.

7. The system of claim 1, wherein the system is configured to form a support structure adjacent to the three-dimensional object during fabrication of the three-dimensional object, and wherein a releasable ink layer is printed between the three-dimensional object and the support structure.

8. The system of claim 7, wherein the support structure is formed from a polymeric material, and wherein the support structure polymeric material is the same as a polymeric material used to form the three-dimensional object.

9. The system of claim 1, wherein at least one of the first ink layer and the second ink layer includes an ink that provides increased flexibility to the three-dimensional object.

10. The system of claim 1, wherein at least one of the first ink layer and the second ink layer includes an ink that creates a smooth surface on the three-dimensional object.

11. The system of claim 1, wherein at least one of the first ink layer and the second ink layer includes an ink selected based on an ink solubility parameter in relation to a polymer solubility parameter.

12. The system of claim 1, wherein at least one of the first ink layer and the second ink layer includes a plasticizing ink selected based on an ink solubility parameter in relation to a polymer solubility parameter.

13. The system of claim 1, wherein the ink printing apparatus is attached to the extruder assembly.

14. The system of claim 1, wherein the extruder assembly includes an extruder, the extruder including a die and a heat source.

15. The system of claim 14, wherein the ink printing apparatus is attached to the extruder.

16. The system of claim 14, wherein the ink printing apparatus is attached to the extruder assembly separate from the extruder.

17. The system of claim 1, wherein the extruder assembly includes a fusion deposition modeling apparatus, a laminated object manufacturing apparatus, and/or a photopolymer deposition apparatus.

18. The system of claim 1, wherein the print head and ink delivery system includes a print head including a thermal print head, a piezo print head, a MEMS print head, an electrostatic print head, a plotter-style single nozzle unit, a continuous ink jet, and/or a drop-on demand system.

19. The system of claim 1, wherein the print head and ink delivery system is further configured to print a target pattern onto a layer of the three-dimensional object.

20. The system of claim 19, further comprising:
   an optical sensor, wherein the system is configured to scan the target pattern with the optical sensor.

21. The system of claim 20, wherein the system is further configured to align the extruder assembly with the target pattern.

22. The system of claim 20, wherein the system is further configured to align the print head with the target pattern.

23. A system comprising:
   an extruder assembly configured to extrude a first polymer layer; and
   an ink printing apparatus comprising a print head and ink delivery system, the ink printing apparatus configured to print a first ink layer on to the first polymer layer;
   wherein the system is configured to repeat extrusion of polymer and printing of ink to form a three-dimensional object;
   wherein the system is configured to treat at least one of the first ink layer and the first polymer layer with a heat source, an energy source, or a combination of the heat source and the energy source.

24. The system of claim 23, wherein the extruder assembly is further configured to extrude a second polymer layer on to the first ink layer and the ink printing apparatus is further configured to print a second ink layer on to the second polymer layer during fabrication of the three-dimensional object, wherein the system is further configure to treat at least one of the second ink layer and the second polymer layer with the heat source, the energy source, or the combination of the heat source and the energy source.

25. The system of claim 23, wherein the first ink layer includes an ink comprising at least one of infrared absorbers, near infrared absorbers, visible energy absorbers, microwave absorbers, or radiofrequency absorbers.

26. The system of claim 23, wherein the system is configured to apply the heat source, the energy source, or the combination of the heat source and the energy source during fabrication of the three-dimensional object or to a fabricated three-dimensional object.

27. The system of claim 23, further comprising the energy source and/or the heat source.

28. The system of claim 23, wherein the ink printing apparatus is attached to the extruder assembly.

29. The system of claim 23, wherein the extruder assembly includes an extruder, the extruder including a die and the heat source.

30. A system comprising:
- an extruder assembly configured to extrude a first polymer layer; and
- a print head and ink delivery system configured to print a first ink layer on to the first polymer layer;
  - wherein the system is configured to repeat extrusion of polymer to form a three-dimensional object.

* * * * *